(12) United States Patent
Chottiner (10) Patent No.: US 10,295,014 B2
(45) Date of Patent: May 21, 2019

(54) ROBUST PENDULUM CRANK BUMPER

(71) Applicant: Ford Global Technologies, LLC, Dearborn, MI (US)

(72) Inventor: Jeffrey Eliot Chottiner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 711 days.

(21) Appl. No.: 14/950,417

(22) Filed: Nov. 24, 2015

(65) Prior Publication Data
US 2017/0146091 A1 May 25, 2017

(51) Int. Cl.
*F16F 15/28* (2006.01)
*F16F 15/14* (2006.01)
*F16C 3/06* (2006.01)

(52) U.S. Cl.
CPC .............. *F16F 15/283* (2013.01); *F16C 3/06* (2013.01); *F16F 15/145* (2013.01)

(58) Field of Classification Search
CPC ........ F16F 15/28; F16F 15/283; F16F 15/145; F16C 3/06; F02B 75/06
USPC .......................................... 123/192.1, 192.2
See application file for complete search history.

(56) References Cited

U.S. PATENT DOCUMENTS

| | | | | |
|---|---|---|---|---|
| 2,332,072 | A * | 10/1943 | Gregory ................ | F16F 15/145 74/604 |
| 2,584,384 | A * | 2/1952 | Galliers .............. | F16F 15/1457 74/604 |
| 4,739,679 | A | 4/1988 | Berger et al. | |
| 8,813,604 | B2 * | 8/2014 | Geist ..................... | F16F 15/145 123/192.2 |
| 8,813,605 | B2 * | 8/2014 | Wakeman ................ | F16C 3/14 123/192.2 |
| 9,068,617 | B2 * | 6/2015 | Pietron ................ | F16F 7/1005 |
| 9,322,454 | B2 * | 4/2016 | Glanfield .............. | F16F 15/286 |
| 9,470,291 | B2 * | 10/2016 | Brevick ................ | F16F 15/145 |
| 9,482,307 | B2 * | 11/2016 | Britton .................. | F16F 15/283 |
| 9,512,897 | B2 * | 12/2016 | Brevick ................ | F16F 15/145 |
| 9,605,707 | B2 * | 3/2017 | Glanfield .............. | F16F 15/145 |
| 2015/0090073 | A1 | 4/2015 | Glanfield et al. | |
| 2015/0128758 | A1 | 5/2015 | Leone et al. | |

(Continued)

FOREIGN PATENT DOCUMENTS

DE 102011100868 A1 * 11/2012 ............ F16F 15/145

*Primary Examiner* — Grant Moubry
(74) *Attorney, Agent, or Firm* — LeClairRyan (57) ABSTRACT

A bumper clip having rubber or elastomeric bumpers for use with a pendulum assembly for attachment to the crankshaft of an internal combustion engine is disclosed. The bumper clip is has particular application for use with pendulum carriers that are formed from stamped steel. By using the stamped steel carrier, more room is created to provide a more robust bumper. The pendulum carrier bumper clip can be either two separate, L-shaped clips or a single U-shaped clip. If the pendulum carrier bumper clip includes two separate clips, each clip includes a bumper surface to which the bumper is attached and an attachment leg for attachment of the clip to the pendulum carrier and to the crankshaft by a fastener such as a bolt. The bumper surface has a channel through which the pendulum carrier passes, thus dividing the bumper surface into two surfaces. A bumper is attached to each surface.

19 Claims, 5 Drawing Sheets

(56) References Cited

U.S. PATENT DOCUMENTS

2015/0219184 A1* 8/2015 Brevick ................... F16C 3/06
  74/604
2016/0327119 A1* 11/2016 Brevick ................ F16F 15/283

\* cited by examiner

ROBUST PENDULUM CRANK BUMPER

TECHNICAL FIELD

The disclosed inventive concept relates generally to stamped steel pendulum crankshafts for internal combustion engines. More particularly, the disclosed inventive concept relates to a robust bumper arrangement for use with stamped steel crankshaft pendulums that prevents metal-to-metal impact of the pendulum assembly on the pendulum carrier by providing robust bumpers that include a pad formed from nylon or another durable material that are attached to a clip. The clip is fixed to the stamped steel pendulum.

BACKGROUND OF THE INVENTION

Internal combustion engines having a relatively small number of cylinders provide automobile makers with an attractive solution to the need for improved fuel economy. In order to compensate for reduction of cubic capacity vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration and high engine block vibration caused by forces, such as first and second engine order forces, that are not cancelled. Such torsional vibrations are ultimately transmitted through the engine mounts and to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent vehicle noise and harshness. Such crankshaft-mounted pendulums function as vibration absorbers as they are tuned to address and thus reduce vibrations generated by oscillating torque, thus smoothing torque output of the crankshafts. This approach is taken as well by designers of some airplane piston engines where the pendulums smooth output torque and reduce stress within the crankshaft itself.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier.

The crankshaft pendulum is interconnected with the pendulum carrier by pairs of rollers that are movable on mating curved tracks. While there are a number of variations of the movable relationship between the pendulum and the crankshaft, it is common to incorporate rolling pins as the points of contact between these two components.

Each rolling pin requires a pendulum rolling pin track in which the rollers can roll. Known rolling pin tracks have great distances between the walls of the tracks and the rolling pins. When the engine is running and the crankshaft is rotating, centrifugal force keeps the pendulum in its full out position. The pendulum responds to the oscillating torque by moving side to side. This reduces the oscillating torque to the transmission to improve NVH. The pendulum can hit the bumpers if the oscillating torque is too high. In this case, the pendulums would need to be detuned. The other time the pendulums hit is during start up and shut down when there is not enough centrifugal force to overcome gravity. The bumpers are intended to reduce the NVH of metal hitting metal in these three cases. In this position, the centrifugal force is sufficient to overcome gravity and the torsionals are so low as not to cause the pendulum to move back and forth. However, when the engine is turned off and rotational movement of the crankshaft stops, centrifugal motion stops as well and the pendulum, no longer held in its full out position, may move to its full travel condition in which the pendulum experiences a drop caused by gravity if the stopped position of the pendulum is "up" or is generally above the midline of the crankshaft. If the pendulum is stopped in this position, then it will drop before hitting metal-on-metal, thus increasing undesirable NVH in the engine and, consequently, in the vehicle.

To compensate for this drop, rubber bumpers are located on the pendulum or on the pendulum carrier to dampen the metal-on-metal contact. When the pendulums are over-excited or during engine start-up or shut-down, the bumpers hit their stops. In known designs, the bumpers are inserted into blind pockets formed in either the pendulum or in the pendulum carrier. Because of insufficient grip length, these bumpers are prone to falling out of their pockets, thus not only failing to achieve their intended purpose, but also creating a risk of clogged oil lines and thus causing early engine failure.

In addition, bumper technologies have not kept pace with design development in the pendulum itself. More recent pendulums designs, such as that disclosed in U.S. Ser. No. 14/663,322, assigned to the assignee of the instant application and incorporated in its entirety by reference, discloses a stamped steel pendulum and pendulum carrier for attachment to the crankshaft. The stamped steel design requires an alternative approach to pendulum bumpers.

Thus a new approach to the pendulum bumpers is needed to address the problems associated with known arrangements.

SUMMARY OF THE INVENTION

The disclosed inventive concept overcomes the challenges faced by known pendulum arrangements for internal combustion engines by providing a robust bumper clip that can be used with stamped steel pendulum carriers. Regardless of engine operation, the pendulum carrier bumper clip of the disclosed inventive concept remains fixed to the pendulum carrier assembly, thus effectively reducing NVH.

The pendulum assembly for attachment to the crankshaft of an internal combustion engine of the disclosed inventive concept comprises a pendulum carrier bumper clip that is attached to the stamped steel pendulum carrier. By using the stamped steel carrier, more room is created to provide a more robust bumper as described herein and as illustrated in the accompanying figures.

The pendulum carrier bumper clip can be either two separate, L-shaped clips or a single U-shaped clip. If the pendulum carrier bumper clip includes two separate clips, each clip includes a bumper surface to which the bumper is attached and an attachment leg for attachment of the clip to the pendulum carrier and to the crankshaft by a fastener such as a bolt. The bumper surface has a channel through which the pendulum carrier passes, thus dividing the bumper surface into two surfaces. A bumper is attached to each surface.

If the pendulum carrier bumper is a single, U-shaped piece, then a channel is formed down the long axis of the bumper surface. The pendulum carrier passes through the channel. Bumpers are provided on each of the surfaces.

The bumper is an energy-absorbing, elastomeric material that may be a natural or synthetic polymeric material, such as rubber or nylon. The bumper is attached to the bumper leg by an adhesive that is capable of withstanding both the high operating temperatures of the internal combustion engine as well as engine oil.

The above advantages and other advantages and features will be readily apparent from the following detailed description of the preferred embodiments in combination with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
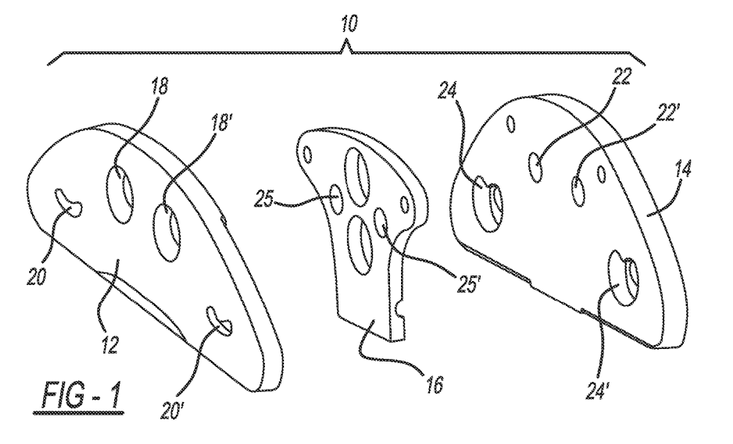
FIG. 1 is an exploded view of the components of a stamped steel pendulum assembly.
Figure 2:
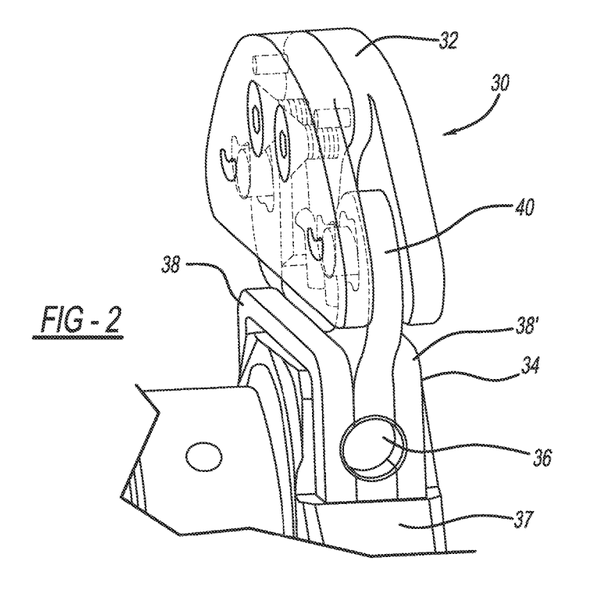
FIG. 2 is a perspective view of a stamped pendulum carrier and method of attachment to the crankshaft.
Figure 3:
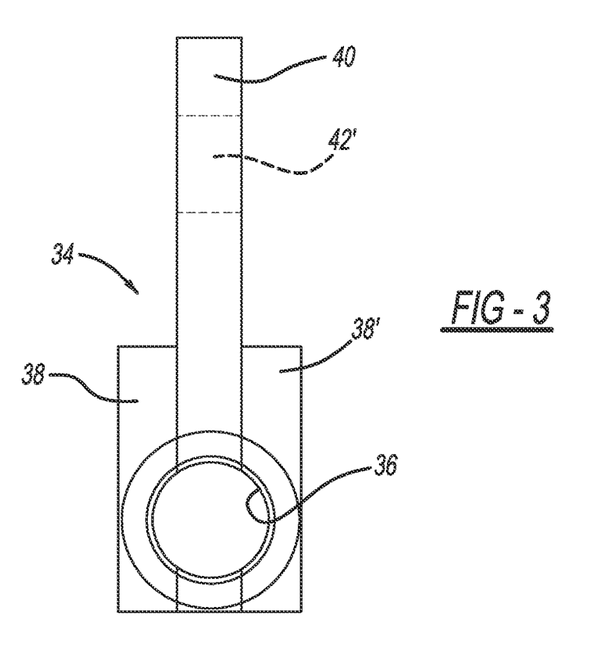
FIG. 3 is an end view of the carrier of FIG. 2.
Figure 9:
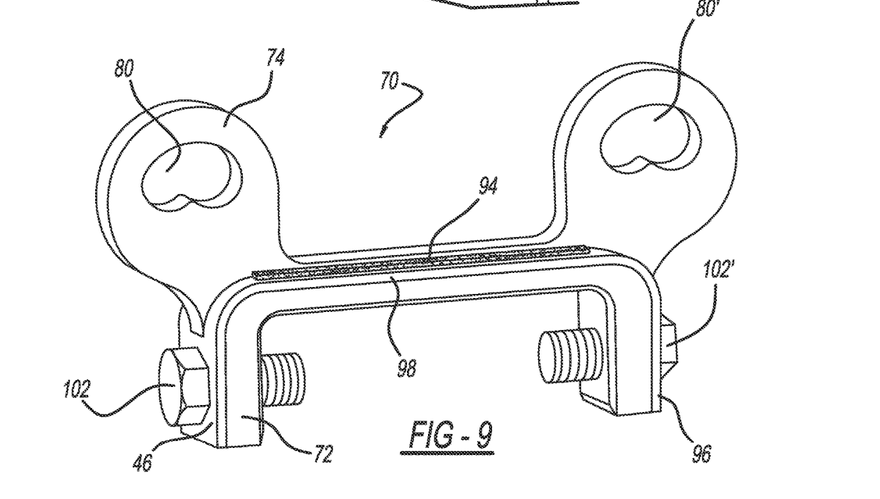
FIG. 9 is a is a perspective view of pendulum and pendulum carrier having a pendulum carrier bumper clip according to the second embodiment of the disclosed inventive concept attached thereto.
Figure 10:
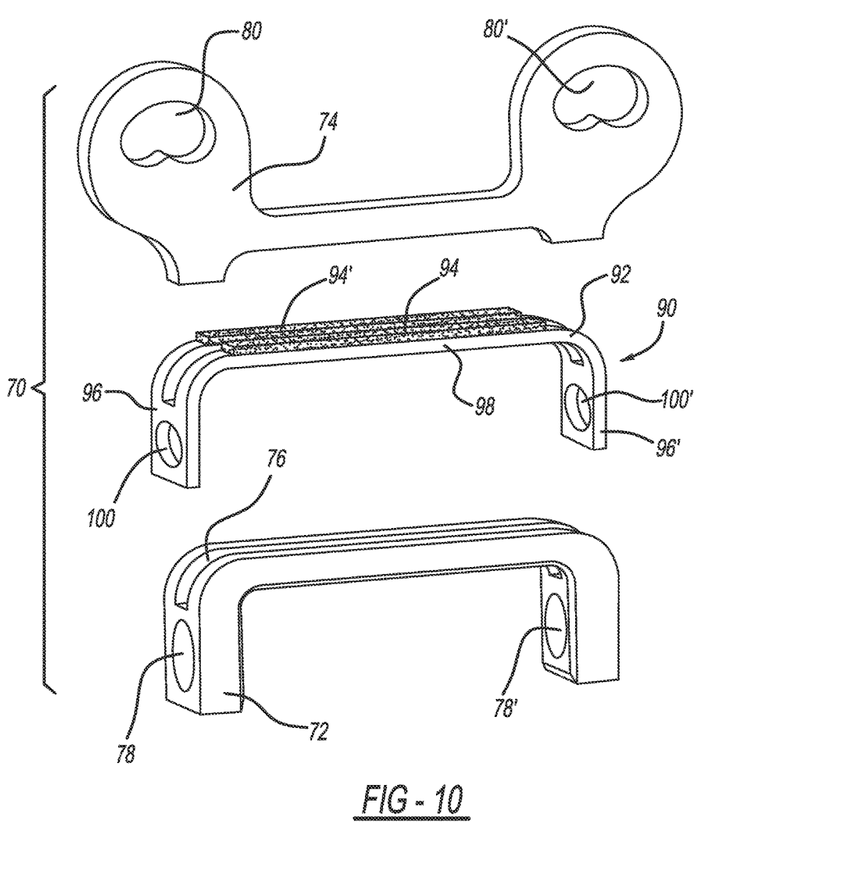
FIG. 10 is an exploded view of the pendulum, pendulum carrier, and pendulum carrier bumper clip of FIG. 9.

Referring to FIGS. 1 through 3, views of a stamped steel pendulum assembly are illustrated. Referring to FIGS. 4 through 8, a first embodiment of a pendulum carrier bumper clip for use with a stamped steel pendulum is illustrated in various views. Referring to FIGS. 9 and 10, a second embodiment of a pendulum carrier bumper clip for use with a stamped steel pendulum is illustrated in various views.

The pendulums, pendulum carriers and pendulum carrier pendulum carrier bumper clips as illustrated and described provide improvements over the prior art in both production cost and performance. It is to be understood that the pendulums, pendulum carriers, and pendulum carrier pendulum carrier bumper clips as illustrated are suggestive and are not intended as being limiting.

FIG. 1 is an exploded view of the components of a stamped steel pendulum assembly, generally illustrated as 10. The pendulum assembly 10 includes a pendulum flat stamped half 12, a pendulum flat stamped half 14, and an intermediate flat stamped spacer 16. A pair of fastener holes 18 and 18' for bolts or rivets are formed in the pendulum flat stamping half 12. The fastener holes 18 and 18' may be left out and the flat stamping halves may be attached by welding instead. A pair of kidney-shaped roller pathways (having circular or cycloidal shapes) 20 and 20' are formed by machining in the pendulum flat stamping half 12. A pair of fastener holes 22 and 22' for bolts or rivets are formed in the pendulum second stamping half 14. The fastener holes 22 and 22' may be left out and the flat stamping halves may be attached by welding instead. A pair of kidney-shaped roller pathways 24 and 24' are formed by machining in the pendulum flat stamping half 14. A pair of fastener holes 25 and 25' are formed in the intermediate flat stamped spacer 16. Stamping of the pendulum flat stamped half 12, the pendulum flat stamped half 14, and the intermediate flat stamped spacer 16 provides shape and features.

Mechanical fasteners such as rivets are used to fasten the pendulum flat stamped half 12, the pendulum flat stamped half 14, and the intermediate flat stamped spacer 16 together. Other mechanical fasteners or welding may be used in the alternative.

In addition to the pendulum assembly 10 being formed from stamped components, the disclosed inventive concept provides that the pendulum carrier, used to attach the pendulum assembly 10 to the crankshaft, is to preferably be formed from stamped components as well.

FIG. 2 illustrates a perspective view of a pendulum assembly, generally illustrated as 30, which includes a pendulum 32 and a pendulum carrier assembly 34. The pendulum 32 may be of the prior art type or may be of the cold forged or cold formed steel type as disclosed herein.

The carrier assembly 34 includes a fastener hole 36 for receiving a fastener such as a shoulder bolt (not shown) to a crankshaft 37. The carrier assembly 34 further includes a first u-shaped stamped carrier shoulder plate 38, a second u-shaped stamped carrier shoulder plate 38', and a central stamped carrier plate 40 fitted between said first and second stamped carrier shoulder plates 38 and 38'. The u-shaped stamped carrier shoulder plates 38 and 38' and the central stamped carrier plate 40 may be attached to each other by a variety of ways, including but not limited to mechanical fastening, welding, pressing and pinning.

Referring to FIGS. 4 through 8, a first embodiment of a pendulum carrier pendulum carrier bumper clip according to the disclosed inventive concept is illustrated in various views. A pendulum carrier pendulum carrier bumper clip, generally illustrated as 50, includes a clip body 52 having attached thereto bumpers 54 and 54'. The clip body 52 includes a pendulum carrier attachment arm 56 and a pad-holding arm 58. A fastener-passing hole 60 is formed in the pendulum carrier attachment arm 56.

The clip body 52 may be cast or, preferably, stamped. The clip body 52 may be made of any of several materials including, without limitation, formed or stamped steel. The bumpers 54 and 54' may be composed of any robust and resilient elastomeric materials including natural or synthetic polymers such as nylon. The bumpers 54 and 54' are attached to the upper, pendulum-facing surface of the pad-holding arm 58 by any of several known adhesives that are both heat- and oil-resistant.

Figure 4:
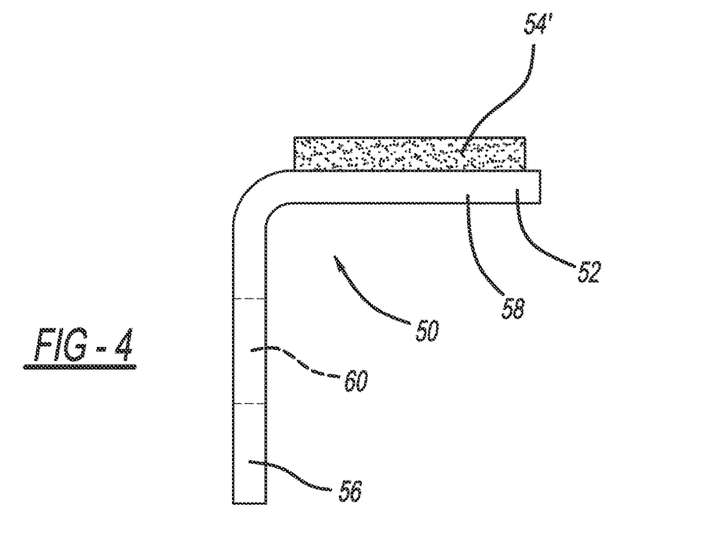
FIG. 4 is a side view of a pendulum carrier bumper clip according to a first embodiment of the disclosed inventive concept.
Figures 5, 6, 7:
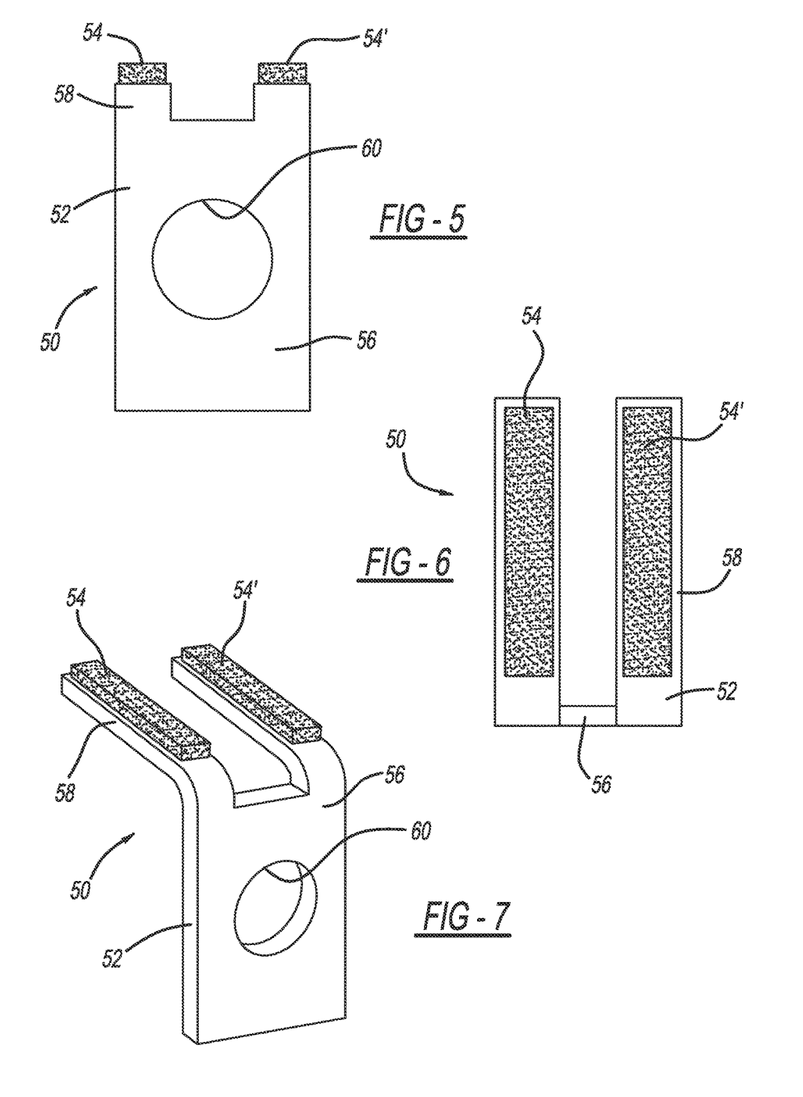
FIG. 5 is an end view of the pendulum carrier bumper clip of FIG. 4.
FIG. 6 is a top view of the pendulum carrier bumper clip of FIG. 4.
FIG. 7 is a perspective view of the pendulum carrier bumper clip of FIG. 4.

The pendulum carrier pendulum carrier bumper clip 50 is provided in pairs for attachment to the pendulum carrier.

Figure 8:
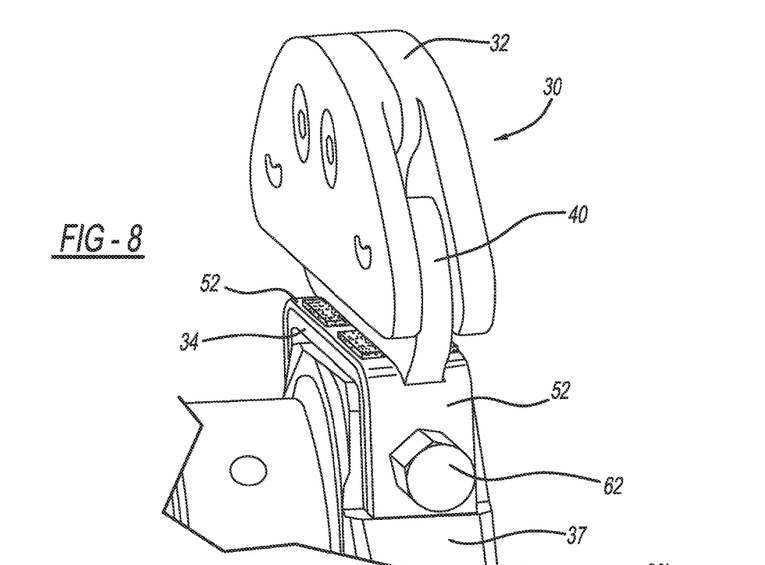
FIG. 8 is a perspective view of pendulum and pendulum carrier having the pendulum carrier bumper clip of FIG. 4 attached thereto.

This arrangement is illustrated in FIG. 8 in which a perspective view of the pendulum assembly 30 having two pendulum carrier pendulum carrier bumper clips 50 attached thereto is shown. As illustrated, one of the pendulum carrier pendulum carrier bumper clips 50 is attached to the carrier assembly 34 and to the crankshaft 37 by a fastener such as a bolt 62. It is to be understood that both pendulum carrier pendulum carrier bumper clips 50 are attached in the same manner, although only one bolt 62 is seen in FIG. 8. As is also understood, the pendulum carrier pendulum carrier bumper clips 50 are attached to the crankshaft 37 at the same time that the carrier assembly 34 is attached during assembly of the crankshaft.

Referring to FIGS. 9 and 10, a second embodiment of a pendulum carrier pendulum carrier bumper clip according to the disclosed inventive concept is illustrated in the two views. In this embodiment, a pendulum carrier assembly, generally illustrated as 70, includes a stamped crankshaft attachment bracket 72 and a stamped pendulum carrier attachment bracket 74. The crankshaft attachment bracket 72 includes a pendulum carrier attachment bracket channel 76 and a pair of fastener holes 78 and 78' for receiving a fastener such as a shoulder bolt (not shown) for attaching the crankshaft attachment bracket 72 to the crankshaft (not shown).

The stamped pendulum carrier attachment bracket 74 and the crankshaft attachment bracket 72 may be attached to each other by a variety of ways, including but not limited to mechanical fastening, welding, pressing and pinning. Kidney-shaped roller pathways 80 and 80' are formed through the stamped pendulum carrier attachment bracket 74. The pendulum (not shown) which is attached to the pendulum carrier assembly 70 may be of the prior art type or may be of the cold forged or cold formed steel type as disclosed herein.

A pendulum carrier pendulum carrier bumper clip, generally illustrated as 90, includes a clip body 92 having attached thereto bumpers 94 and 94'. The clip body 92 includes a first pendulum carrier attachment arm 96, a second pendulum carrier attachment arm 96', and a pad-holding arm 98. A first fastener-passing hole 100 is formed in the first pendulum carrier attachment arm 96 and a second fastener-passing hole 100' is formed in the first pendulum carrier attachment arm 96'.

As with the clip body 52, discussed above, the clip body 92 may be cast or, preferably, stamped. The clip body 92 may also be made of any of several materials including, without limitation, formed or stamped steel. The bumpers 94 and 94' may also be composed of rubber or any robust and resilient elastomeric materials including synthetic polymers such as nylon. The bumpers 94 and 94' are attached to the upper, pendulum-facing surface of the pad-holding arm 98 by any of several known adhesives that are both heat- and oil-resistant.

The pendulum carrier pendulum carrier bumper clip 90 is fitted substantially over the crankshaft attachment bracket 72 as illustrated in FIG. 9. As illustrated, the pendulum carrier pendulum carrier bumper clip 90 is attached to the crankshaft attachment bracket 72 and to the crankshaft (not shown) by a fastener such as bolts 102 and 102'.

The disclosed inventive concept as set forth above overcomes the challenges faced by known pendulum crankshaft arrangements for internal combustion engines by providing an improved impact-dampening arrangement that provides a robust impact-absorbing surface that reduces undesirable NVH during engine start up and shut down. Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A pendulum crankshaft assembly for an internal combustion engine comprising:
    a crankshaft;
    a pendulum carrier attached to said crankshaft;
    a pendulum attached to said pendulum carrier;
    a bumper clip attached to said pendulum carrier and to said crankshaft, said bumper clip having a bumper leg and a fastener leg, said bumper leg of said bumper clip having a pendulum carrier-passing channel formed therein; and
    a rubber or elastomeric bumper attached to said bumper leg.

2. The pendulum crankshaft assembly of claim 1 wherein said bumper clip is L-shaped.

3. The pendulum crankshaft assembly of claim 1 wherein said bumper clip includes two opposed L-shaped ends.

4. The pendulum crankshaft assembly of claim 1 wherein said bumper clip comprises two opposed L-shaped bumper clips.

5. The pendulum crankshaft assembly of claim 1 wherein said rubber or elastomeric bumper includes two rubber or elastomeric bumpers.

6. The pendulum crankshaft assembly of claim 1 wherein said bumper leg has a long axis and wherein said pendulum carrier-passing channel is formed along said long axis.

7. The pendulum crankshaft assembly of claim 1 wherein said rubber or elastomeric bumper includes two rubber or elastomeric bumpers with each of said two bumpers being fitted to each side of said channel.

8. The pendulum crankshaft assembly of claim 1 further including a pair of bolts for attaching said pendulum carrier and said bumper clip to said crankshaft.

9. A pendulum crankshaft assembly for an internal combustion engine comprising:
    a crankshaft;
    a pendulum;
    a pendulum carrier attached to said crankshaft, said pendulum being attached to said pendulum carrier, said pendulum carrier including a stamped crankshaft attachment bracket and a stamped pendulum carrier attachment bracket;
    a bumper clip attached to said pendulum carrier and to said crankshaft, said bumper clip having an energy-absorbing bumper and a pendulum carrier-passing channel formed therein.

10. The pendulum crankshaft assembly of claim 9 wherein said bumper clip includes a bumper leg and an attachment leg, said energy-absorbing bumper being attached to said bumper leg.

11. The pendulum crankshaft assembly of claim 10 wherein said pendulum carrier-passing channel is formed in said bumper leg of said bumper clip.

12. The pendulum crankshaft assembly of claim 11 wherein said energy-absorbing bumper includes two energy-absorbing bumpers.

13. The pendulum crankshaft assembly of claim 9 wherein said energy-absorbing bumper is composed of rubber or elastomeric material.

14. The pendulum crankshaft assembly of claim 9 wherein said bumper clip is L-shaped.

15. The pendulum crankshaft assembly of claim 9 wherein said bumper clip includes two opposed L-shaped ends.

16. The pendulum crankshaft assembly of claim 9 wherein said bumper clip comprises two opposed L-shaped bumper clips.

17. A pendulum crankshaft assembly for an internal combustion engine comprising:
- a crankshaft;
- a pendulum;
- a pendulum carrier attached to said crankshaft, said pendulum being attached to said pendulum carrier;
- a bumper clip attached to said pendulum carrier and to said crankshaft, said bumper clip having a bumper leg, said bumper leg having a channel formed therein to define two bumper surfaces; and
- an energy-absorbing bumper attached to each of said bumper surfaces.

18. The pendulum crankshaft assembly of claim 17 wherein said bumper clip is L-shaped.

19. The pendulum crankshaft assembly of claim 18 wherein said bumper clip is U-shaped.

* * * * *